United States Patent [19]
Huret et al.

[11] 3,813,955
[45] June 4, 1974

[54] DEVICE FOR THE ACCURATE CONTROL OF TRANSLATORY MOVEMENT AND IN PARTICULAR OF THE TRANSLATORY DISPLACEMENT OF A BICYCLE CHAIN FROM ONE CHAIN WHEEL TO THE OTHER

[76] Inventors: Jacques André Huret; Roger Henri Marius Huret, both of 60, Avenue Felix Faure, Nanterre (Hauts de Seine) France

[22] Filed: June 26, 1972

[21] Appl. No.: 266,178

[30] Foreign Application Priority Data
Sept. 17, 1971 France.......................... 71.33637

[52] U.S. Cl............................................. 74/217 B
[51] Int. Cl............................................. F16h 11/00
[58] Field of Search ............................... 74/217 B

[56] References Cited
FOREIGN PATENTS OR APPLICATIONS

| 878,199 | 9/1961 | Great Britain | 74/217 B |
|---|---|---|---|
| 59,098 | 4/1954 | France | 74/217 B |
| 965,419 | 9/1950 | France | 74/217 B |
| 1,026,010 | 4/1953 | France | 74/217 B |
| 888,564 | 12/1943 | France | 74/217 B |
| 1,008,051 | 10/1965 | Great Britain | 74/217 B |

Primary Examiner—Manuel A. Antonakas
Assistant Examiner—R. H. Lazarus
Attorney, Agent, or Firm—Seidel, Gonda & Goldhammer

[57] ABSTRACT

The invention relates to a device for the accurate control of translatory movement and in particular of the translatory displacement of a bicycle chain from one chain wheel to the other this device consisting of a deformable parallelogram of which one of two opposite branches consists of a fixed support and the other of the means of effecting translatory displacement, one of the other two opposite branches consisting of a rod articulated by its ends on the fixed support and the translatory displacement control device, and the other by a part in the shape of an arc of a circle, which is part of the fixed support and which supports the means for effecting translatory displacement.

5 Claims, 3 Drawing Figures

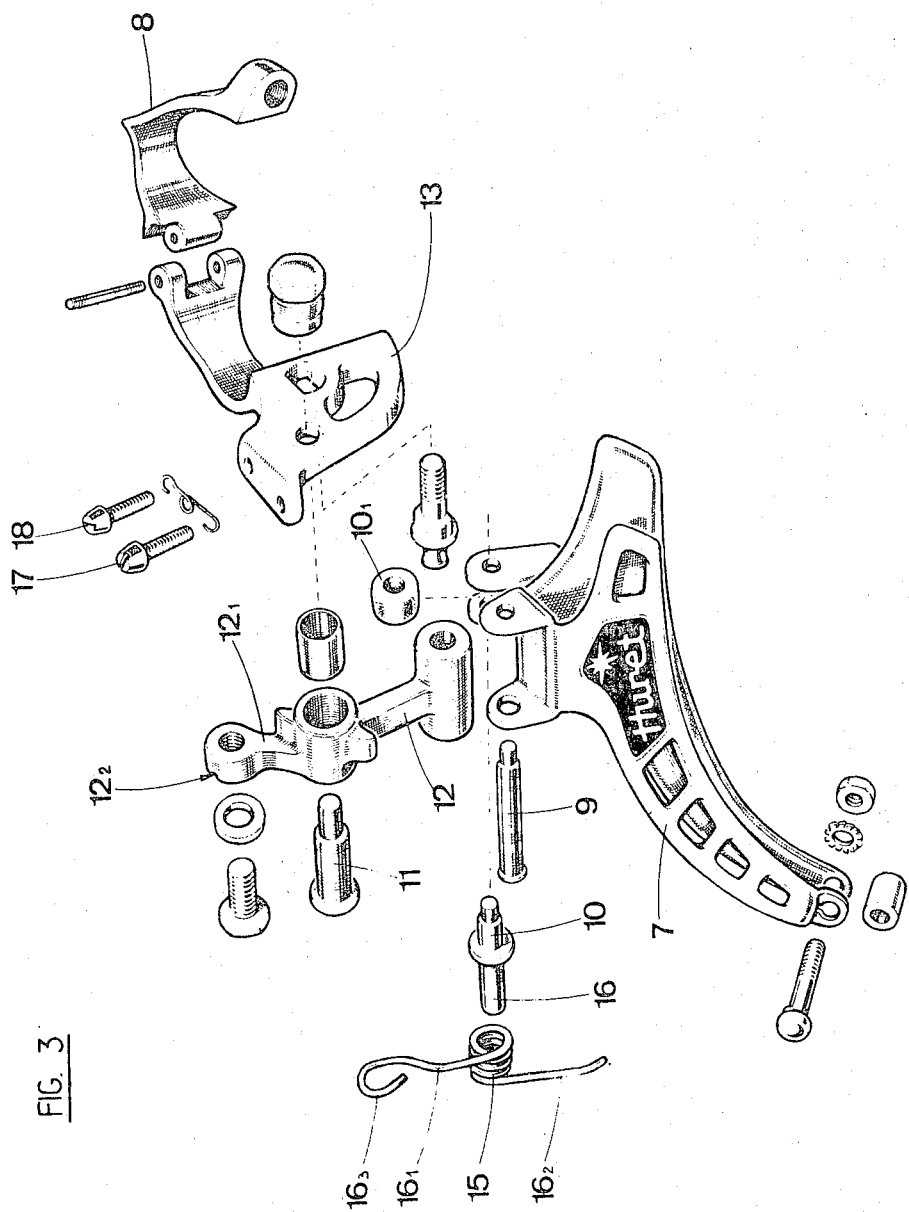

DEVICE FOR THE ACCURATE CONTROL OF TRANSLATORY MOVEMENT AND IN PARTICULAR OF THE TRANSLATORY DISPLACEMENT OF A BICYCLE CHAIN FROM ONE CHAIN WHEEL TO THE OTHER

The invention relates to a device for the control of translatory movement and in particular of the translatory displacement of a bicycle chain from one chain wheel to the other.

Devices consisting of four articulated rods to form a deformable parallelogram are already known. Such a deformable parallelogram can then be positioned in a manner such as to effect the translatory movement control of any means.

The translatory displacement of the rollers of the gear shift of a bicycle is thus effected with the aid of such a deformable parallelogram of which the deformation is effected by a pull exerted on a cable which is connected to the prolongation of one of the articulated rods.

However, these devices, although good, can in certain cases be considered as lacking in accuracy, since the play that exists between the different articulations of the deformable parallelogram add up and detract from the accuracy of the movement, this accuracy diminishing with use of the device and consequent wear of the gear shift.

Similarly, it must be pointed out that the lack of accuracy in the utilization of a deformable parallelogram in a gear shift of a bicycle becomes relatively large, taking into account the small size of the articulated rods constituting the deformable parallelogram.

The object of the present invention is in particular to overcome this disadvantage and relates to this end to a device for the control of translatory movement, and in particular of the translatory displacement of a bicycle chain from one chain wheel to the other, device characterized in that it consists of a deformable parallelogram of which one of the two opposite branches consists of a fixed support, the other of the means of effecting translatory displacement, one of the other two opposite branches consisting of a rod articulated by its ends on the fixed support and on the translatory displacement control device, and the other by a part in the shape of an arc of a circle, which is part of a fixed support and which supports the means for effecting translatory displacement.

According to a characteristic feature of the invention, the means of controlling the translatory displacement comprises a roller of which the axle constitutes one of the vertices of the deformable parallelogram, this roller bearing by its periphery on the periphery of the part in the shape of an arc whose center is another apex of the deformable parallelogram.

The invention is illustrated by way of non-limitative example on the accompanying drawings in which:

FIG. 3 is an exploded perspective view of the device illustrated in FIGS. 1 and 2.

Figure 1:
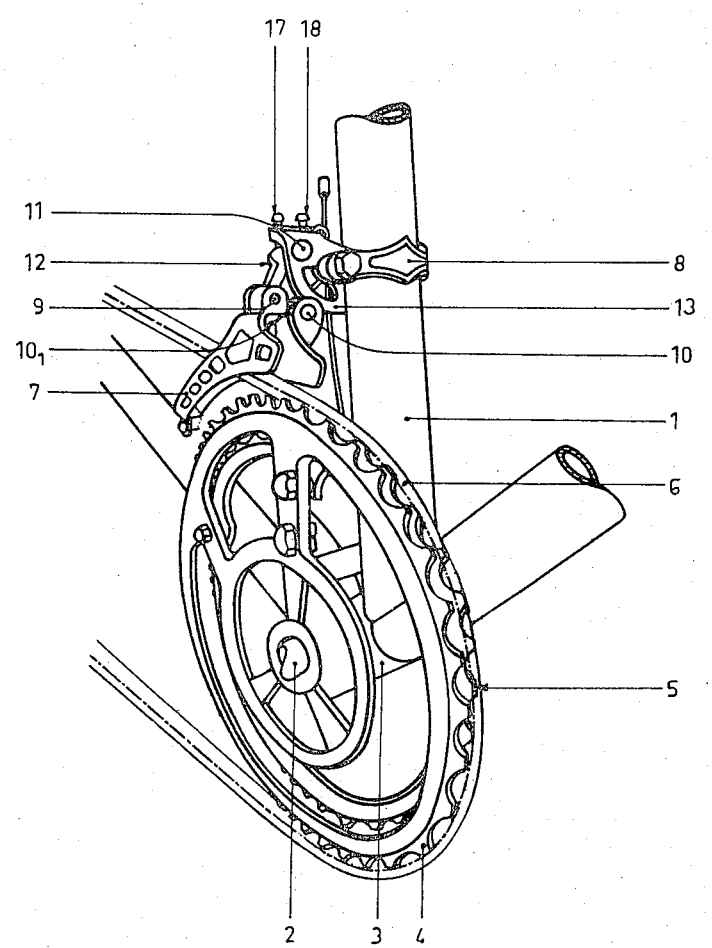
FIG. 1 is a partial perspective view of a bicycle frame at the height of a crank-gear and provided with a device according to the invention.
Figure 2:
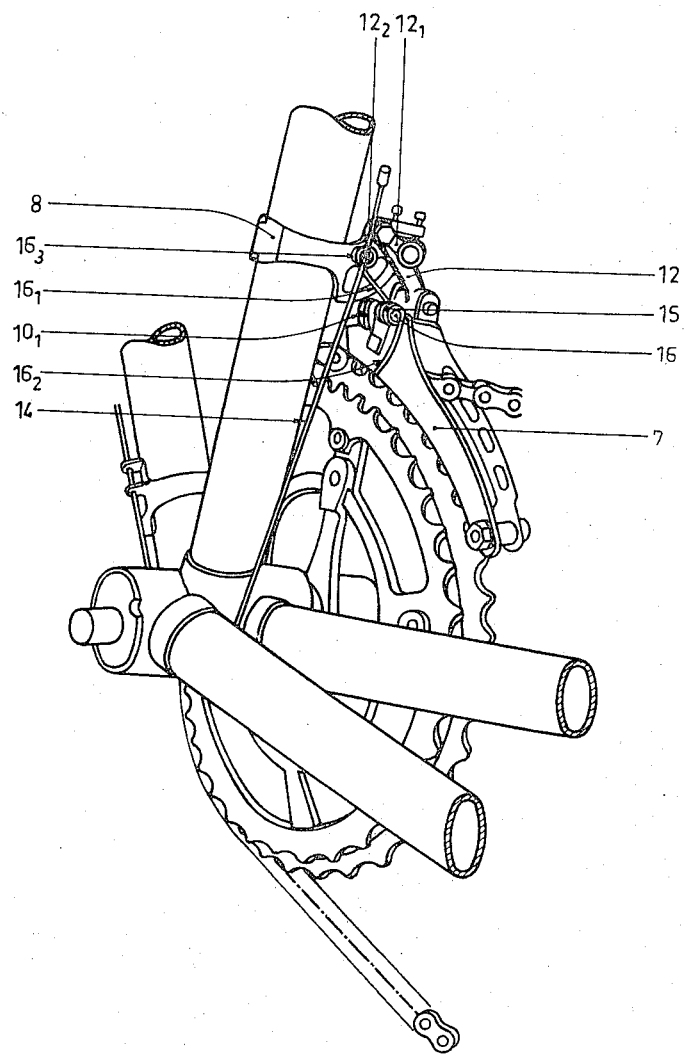
FIG. 2 is a rear view of the drawing in FIG. 1.

The object of the device according to the invention is therefore to enable the translatory control of various parts to be effected, the controls being effected with great accuracy and particularly without any play by a device of lesser weight.

In the examples illustrated on the accompanying drawings, the device is mounted on the frame 1 of a bicycle of which the axle 2 of the hub of the crank-gear 3 comprises two chain wheels 4 and 5 of different diameters placed one beside the other. The driving chain of the bicycle is made to pass over one or the other of the chain wheels 4 and 5, as is known, a shifting of gears of the bicycle is effected by making the chain pass from one of the chain wheels 4 or 5 to the other.

It is evident that such a bicycle is generally provided with a gear shift which in addition enables the chain to pass from one pinion of the free wheel to another, this free wheel being mounted axially on the rear wheel of the bicycle.

The device according to the invention which enables the chain of the chain wheel 4 to pass to and from chain wheel 5, is constituted by a fork 7 consisting of two plates which frame chain 6 and a support 8 fixed on one of the tubes constituting the frame of the bicycle.

The fixed support 8 and the fork are connected by a deformable parallelogram of which two of the vertices are constituted by the axles 9 and 10 which are mounted on a fork 7 and of which the two other vertices, of which one incidentally is imaginary, are mounted on the fixed support part 8.

One of the axles mounted on the fixed support part is constituted by the axle 11 on which is articulated the rod 12, which is also articulated on the axle 9 of the fork.

The fourth apex delimiting, with the axles 9, 10 and 11 the deformable parallelogram is an imaginary axle constituted by the center of a part in the shape of an arc of a circle 13 which is part of the fixed support 8 and on the periphery of which presses a roller $10_1$ mounted on the axle 10.

In this construction, the length of the rod 12 articulated at 9 and 10 is equal to the sum of the radii of the roller $10_1$ and of the part in the shape of an arc of a circle 13.

The control of the device is effected by means of a cable 14 actuated by a handle (not shown) fixed on the frame of the bicycle, this cable being fixed at $12_2$ to a prolongation $12_1$ of the articulated rod 12.

Consequently, when the cable 14 is acted upon, the articulated rod 12 pivots about the axle 11 and causes the deformation of the parallelogram and therefore the translatory displacement of the fork 7, the distance of which from the axles 9 and 10 is determined by one of the sides of the parallelogram.

In this construction, the roller $10_1$ is obviously maintained pressed against the periphery in the shape of an arc of a circle of the part 13. This is effected by means of a spiral spring 15 which is mounted on an axle 16 located in the prolongation of the axle of the roller $10_1$.

The spiral spring 15 comprises two ends $16_1$ and $16_2$. The end $16_1$ rests on the support part 8 whereas the end $16_2$ rests on the fork 7.

The spring 15 is mounted under tension in a way such that it constantly presses the roller $10_1$ onto the periphery of the part in the shape of an arc of a circle 13. In the example shown, the end $16_1$ of the spring is fixed to the support part 8 and in the present case this is done at $16_3$ at a point which coincides with the center of the part in the shape of an arc of a circle 13.

To delimit the two extreme deformation positions of the deformable parallelogram, each corresponding to the positioning of the fork 7 in the plane of the chain wheels 4 or 5, there are two cone-pointed set-screws 17, 18 of which the end of one bears on the articulated rod 12, and the other on the prolongation $12_1$, that is, on each side of the axle 11.

It is obvious that the invention is not limited to the examples of its application herein above described and illustrated and that on the basis of these other modes and other forms of application can be envisaged without departing from the scope of the invention.

What is claimed is:

1. A device for controlling the movement of a bicycle chain from one chain wheel to a second chain wheel laterally displaced from the first wheel comprising a deformable parallelogram, said parallelogram comprising a pluraliy of links, one of said links comprising means for fixing it against movement and a second link opposite said first link comprising means for engaging and moving the bicycle chain, a third link comprising a rod, means at each end of said rod for pivotally connecting it to said first and second links, and a fourth link, said fourth link comprising a member having an arcuate surface, means for causing said second link to engage said arcuate surface, and means for deforming said parallelogram.

2. A device as defined in claim 1 wherein said means for causing said second link to engage said arcuate surface comprises a roller, said roller having an axle which comprises one of the vertices of said deformable parallelogram, said roller engaging said arcuate surface, and the center of said arcuate surface defines a vertex of said deformable parallelogram.

3. A device as defined in claim 2 including resilient means disposed between said fixed link and said second link for pressing said roller against said arcuate surface.

4. A device as defined in claim 3 wherein said resilient means comprises a spring having two ends, said spring being mounted under tension, one of said two ends being in engagement with said fixed link and the other being in engagement with said means for engaging and moving the bicycle chain.

5. A device as defined in claim 4 wherein said spring is a spiral spring, means mounting said spring coaxially with said roller, and one of the ends of said spring being fixed at a point corresponding to the center of said arcuate surface.

* * * * *